United States Patent
Oteyza

(10) Patent No.: US 9,588,839 B1
(45) Date of Patent: Mar. 7, 2017

(54) METHODS AND SYSTEMS FOR USING SHARED LOGIC AT NETWORK DEVICES

(71) Applicant: QLOGIC Corporation, Aliso Viejo, CA (US)

(72) Inventor: Raul Oteyza, Yorba Linda, CA (US)

(73) Assignee: QLOGIC Corporation, Aliso Viejo, CA (US)

( * ) Notice: Subject to any disclaimer, the term of this patent is extended or adjusted under 35 U.S.C. 154(b) by 9 days.

(21) Appl. No.: 14/805,161

(22) Filed: Jul. 21, 2015

(51) Int. Cl.
  *H04L 12/40* (2006.01)
  *H04L 12/24* (2006.01)
  *H04L 12/931* (2013.01)
  *G06F 11/10* (2006.01)
  *H04L 1/00* (2006.01)
  *H04L 12/00* (2006.01)

(52) U.S. Cl.
  CPC ............ *G06F 11/10* (2013.01); *H04L 1/0061* (2013.01)

(58) Field of Classification Search
  None
  See application file for complete search history.

(56) References Cited

U.S. PATENT DOCUMENTS

| | | | | |
|---|---|---|---|---|
| 7,383,353 | B2* | 6/2008 | Valdevit | H04L 45/12 709/238 |
| 9,430,437 | B1* | 8/2016 | Krishnan | G06F 13/4027 |
| 2013/0003559 | A1* | 1/2013 | Matthews | H04L 43/0876 370/241 |
| 2014/0376566 | A1* | 12/2014 | Mehta | H04L 49/357 370/419 |
| 2015/0098343 | A1* | 4/2015 | Mehta | H04L 41/0816 370/244 |
| 2015/0244649 | A1* | 8/2015 | Krakirian | H04L 49/30 370/419 |

* cited by examiner

*Primary Examiner* — Justin R Knapp
(74) *Attorney, Agent, or Firm* — Klein, O'Neill & Singh, LLP

(57) ABSTRACT

Methods and systems for network devices is provided. In one aspect, a network device includes a plurality of ports, where the plurality of ports are configured to operate in a first operating mode as a single port at a first speed and in a second operating mode where each of the plurality of ports operate as an independent port at a second operating speed; a shared memory device for staging information received from a network for the plurality of ports operating in the first operating mode and the second operating mode; a receive port selector that selects information from the shared memory device when the plurality of ports are operating in the second operating mode; and a shared error correction code module for decoding and performing error correction on information received via the network for the first operating mode and the second operating mode.

20 Claims, 6 Drawing Sheets

METHODS AND SYSTEMS FOR USING SHARED LOGIC AT NETWORK DEVICES

BACKGROUND

Technical Field

The present aspects relate to networks and more particularly, to using shared logic at network devices.

Related Art

Networking systems are commonly used to move network information (which may also be referred to interchangeably, as frames, packets or commands) between computing systems (for example, servers) or between computing systems and network devices (for example, storage systems). Various hardware and software components are used to implement network communication. Continuous efforts are being made to improve network communications.

SUMMARY

The present aspects have several features, no single one of which is solely responsible for their desirable attributes. Without limiting the scope of the present aspects as expressed by the claims that follow, their more prominent features now will be discussed briefly. After considering this discussion, and particularly after reading the section entitled "Detailed Description," one will understand how the features of the present aspects provide the advantages described herein.

In one aspect, a network device is provided. The network device includes a plurality of ports for connecting the network device to a network via a plurality of links, where the plurality of ports are configured to operate in a first operating mode as a single port operating at a first operating speed and in a second operating mode where each of the plurality of ports operate as an independent port connected to the network via one of the plurality of links at a second operating speed; a shared memory device for staging information received from the network for the plurality of ports operating in the first operating mode and the second operating mode; a receive port selector that selects information from the shared memory device when the plurality of ports are operating in the second operating mode; and a shared error correction code module for decoding and performing error correction on information received via the network for the first operating mode and the second operating mode.

In another aspect, a machine implemented method is provided. The method includes configuring a plurality of ports of a network device to operate in a first operating mode or a second operating mode for connecting the network device to a network via a plurality of links, where in the first operating mode the plurality of ports are configured as a single port operating at a first operating speed and in the second operating mode, each of the plurality of ports operate as an independent port at a second operating speed; staging information received from the network for the plurality of ports operating in the first operating mode and the second operating mode at a shared memory device; selecting by a receive port selector information from the shared memory device when the plurality of ports are operating in the second operating mode; and decoding by a shared error correction code module and performing error correction on information received via the network for the first operating mode and the second operating mode.

In yet another aspect, a non-transitory, machine readable storage medium having stored thereon instructions for performing a method having machine executable code is provided. The machine executable code which when executed by at least one machine, causes the machine to: configure a plurality of ports of a network device to operate in a first operating mode or a second operating mode for connecting the network device to a network via a plurality of links, where in the first operating mode the plurality of ports are configured as a single port operating at a first operating speed and in the second operating mode, each of the plurality of ports operate as an independent port at a second operating speed; stage information received from the network for the plurality of ports operating in the first operating mode and the second operating mode at a shared memory device; select by a receive port selector information from the shared memory device when the plurality of ports are operating in the second operating mode; and decode by a shared error correction code module and performing error correction on information received via the network for the first operating mode and the second operating mode.

This brief summary has been provided so that the nature of the various aspects of the present disclosure may be understood quickly. A more complete understanding of the various aspects of the present disclosure can be obtained by reference to the following detailed description of the preferred aspects thereof concerning the attached drawing.

BRIEF DESCRIPTION OF THE DRAWINGS

The various present aspects now will be discussed in detail with an emphasis on highlighting the advantageous features. These aspects depict the novel and non-obvious network devices having configurable receive packet queues and related methods shown in the accompanying drawings, which are for illustrative purposes only. These drawings include the following figures, in which like numerals indicate like parts.

DETAILED DESCRIPTION

Figure 1:
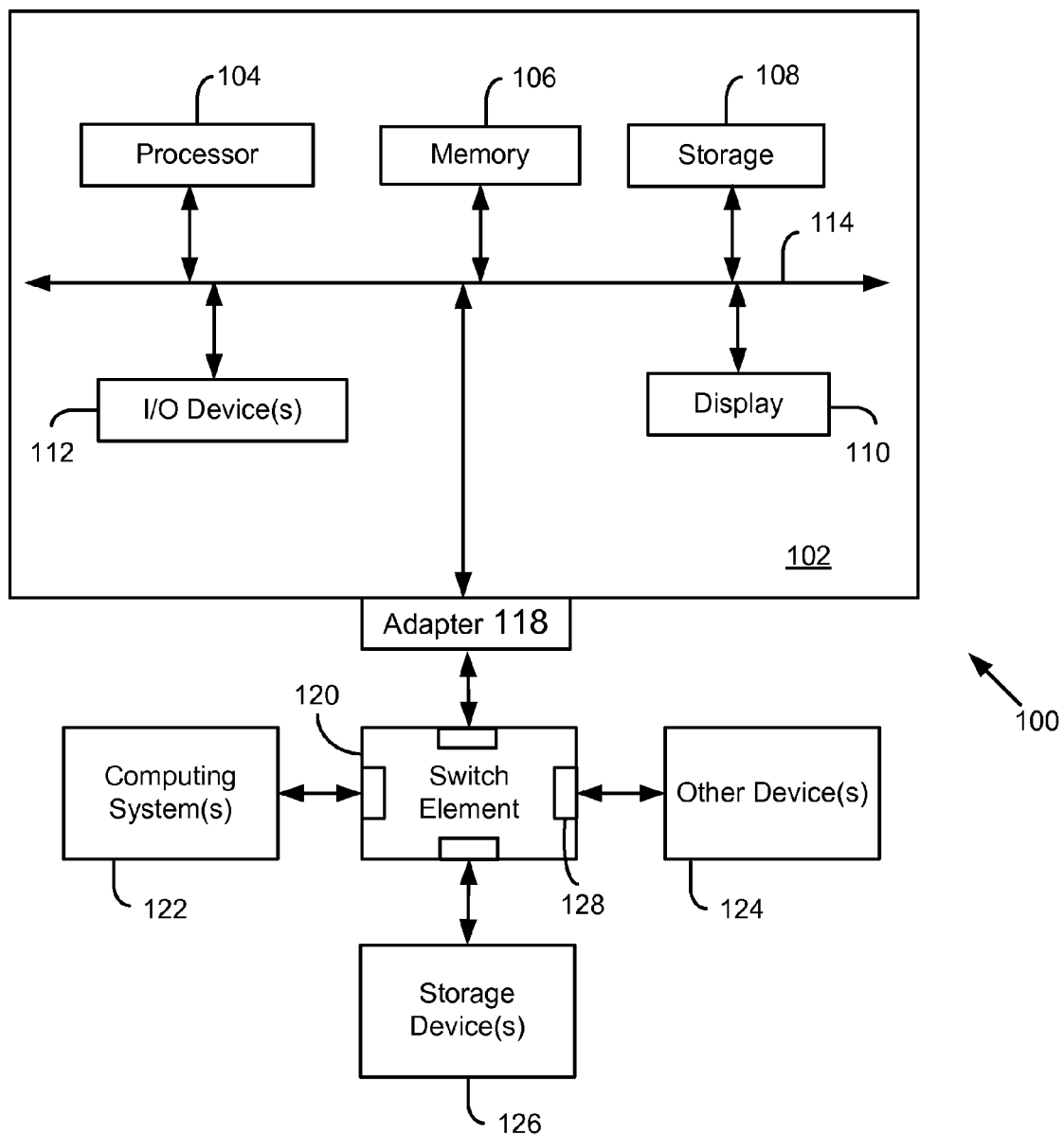
FIG. 1 is a functional block diagram of a system in which the various aspects of the present disclosure may be used.

The following detailed description describes the present aspects with reference to the drawings. In the drawings, reference numbers label elements of the present aspects. These reference numbers are reproduced below in connection with the discussion of the corresponding drawing features.

As a preliminary note, any of the aspects described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.). Machine-readable media may also encompass transitory forms for representing information, including various hardwired and/or wireless links for transmitting the information from one point to another.

The aspects disclosed herein, may be implemented as a computer process (method), a computing system, or as an article of manufacture, such as a computer program product or non-transitory, computer-readable media. The computer program product may be non-transitory, computer storage media, readable by a computer device, and encoding a computer program of instructions for executing a computer process.

Various network standards and protocols may be used to enable network communications, including Fibre Channel (FC), Fibre Channel over Ethernet (FCoE), Ethernet, and others. Below is a brief introduction to some of these standards. The present aspects are described herein with reference to the Fibre Channel and Ethernet protocols. However, these protocols are used merely for ease of reference and to provide examples. The present aspects are not limited to Fibre Channel and Ethernet.

Fibre Channel (FC) is a set of American National Standards Institute (ANSI) standards. Fibre Channel provides a serial transmission protocol for storage and network protocols such as HIPPI, SCSI, IP, ATM and others. Fibre Channel provides an input/output interface to meet the requirements of both Channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes them to other ports. Fibre Channel switches use memory buffers to hold frames received and sent across a network. Associated with these buffers are credits, which are the number of frames that a buffer can hold per Fabric port.

Ethernet is a family of computer networking technologies for local area networks (LANs). Systems communicating over Ethernet divide a stream of data into individual packets called frames. Each frame contains source and destination addresses and error-checking data so that damaged data can be detected and re-transmitted. Ethernet is standardized in IEEE 802.3, which is incorporated herein by reference in its entirety.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use high speed Ethernet networks while preserving the Fibre Channel protocol.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

System 100:

FIG. 1 shows an example of a system 100 that may be used in connection with the various aspects of the present disclosure. System 100 may include a computing system 102, which may be referred to as a host system or a host computing system. A typical host system 102 includes several functional components, including a central processing unit (CPU) (also referred to as a processor/processors or processing module) 104, a host memory (or main/system memory) 106, a storage device 108, a display 110, input/output ("I/O") device(s) 112, and other components (or devices). The host memory 106 is coupled to the processor 104 via a system bus or a local memory bus 114.

The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices. The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse and others. The host system 102 may also include other devices/interfaces for performing various functions, details of which are not germane to the inventive aspects described herein.

The host system 102 also includes an adapter (may also be referred to as network adapter, host bus adapter or as a network device) 118 for communicating with other computing systems 122, storage devices 126, and other devices 124 via a switch 120 (or other devices) and various links. The adapter 118 enables communication between the host system 102, other computing systems 122, storage devices 126, and other devices 124. The adapter 118 may include a converged network adapter, for processing information complying with storage and network protocols, for example, Fibre Channel and Ethernet. As an example, the adapter 118 may be an FCoE adapter. In another aspect, the adapter 118 may be a host bus adapter, for example, a Fibre Channel host bus adapter.

In one aspect, processor 104 of the host system 102 may execute various applications, for example, an e-mail server application, databases, and other application types. Data for various applications may be shared between the computing systems 122 and stored at the storage devices 126. Information may be sent via switch 120 ports. The term port as used herein includes logic and circuitry for receiving, processing, and transmitting information.

Each device (e.g. the host system 102, the computing systems 122, the storage devices 126, and the other devices 124) may include one or more ports for receiving and transmitting information, for example, node ports (N_Ports), Fabric ports (F_Ports), and expansion ports (E_Ports). Node ports may be located in a node device, e.g. adapter 118 of host system 102 and at an adapter (not shown) for the storage devices 126. Fabric ports are typically located in Fabric devices, such as the switch 120.

Figure 2:
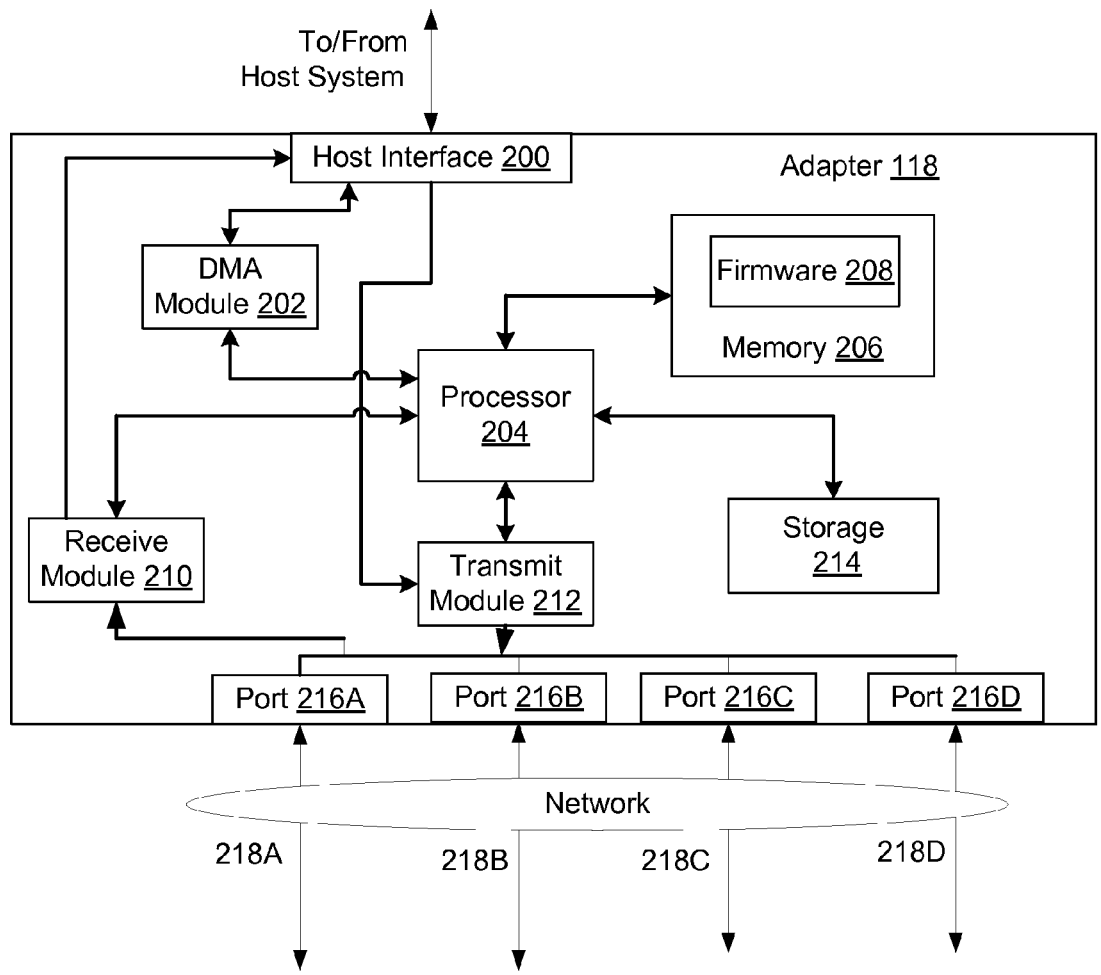
FIG. 2 is a functional block diagram of an adapter, used according to the various aspects of the present disclosure.

Adapter 118:

FIG. 2 is a high-level block diagram of the adapter 118, according to one aspect of the present disclosure. Adapter 118 illustrates aspects of the present disclosure, but it is important to note that other network devices, such as switch element 120 or routers may also implement the optimization and network processing techniques described herein. As illustrated, in one aspect, adapter 118 includes a host interface 200 for communicating with host system 102, a direct memory access (DMA) module 202, a receive module 210, a transmit module 212, a plurality of ports 216A-216D (may also be referred to as port 216 or ports 216), a processor 204, a memory 206 for storing firmware instructions 208, and a local storage device 214. The local storage device 214 may be a non-volatile memory for storing adapter parameters and other information.

The host interface 200 accepts outgoing network transmissions from the host system 102 and sends them to the transmit module 212 for processing and then sending out via ports 216. Incoming network transmissions are similarly accepted from the network at ports 216, sent to the receive module 210, and forwarded to the host system 102 through host interface 200 by the DMA module 202. The DMA module 202, the transmit module 212, and the receive module 210 may all interact with or be controlled by processor 204 in various aspects. The DMA module 202 may be used to access a PCI-Express link (not shown) for sending and receiving information, to and from the host 102 processor via host interface 200.

In one aspect, ports 216 may be a generic port (GL) and may include an N_Port, F_Port, FL_Port, E_Port, or any other port type. Ports 216 may be configured to operate as FCoE, FC or Ethernet ports. In other words, depending upon what it is attached to, a GL port can function as any type of port.

In one aspect, all the four ports (shown as an example) may be configured to operate as a single port via network links 218. Each port may also be configured to operate as an independent port. For example, ports 216A-216D may be configured to operate as a single X gigabits per second (Gbps or ("G")) (for example, 128 Gbps) port. This may be referred to as the first operating mode. In another aspect, each port may be configured to operate as an independent port operating at Y Gbps (for example, 32 Gbps) port for sending and receiving information. This may be referred to as the second operating mode. In one aspect, regardless of the operating mode (i.e. multiple ports configured as one port or multiple ports operating as independent ports), the adapter 118 uses shared logic for processing information that is received from other devices. By using shared logic, the overall gate count at a physical coding sub layer (PCS) at each port is reduced, as described below in detail.

Figure 3A:
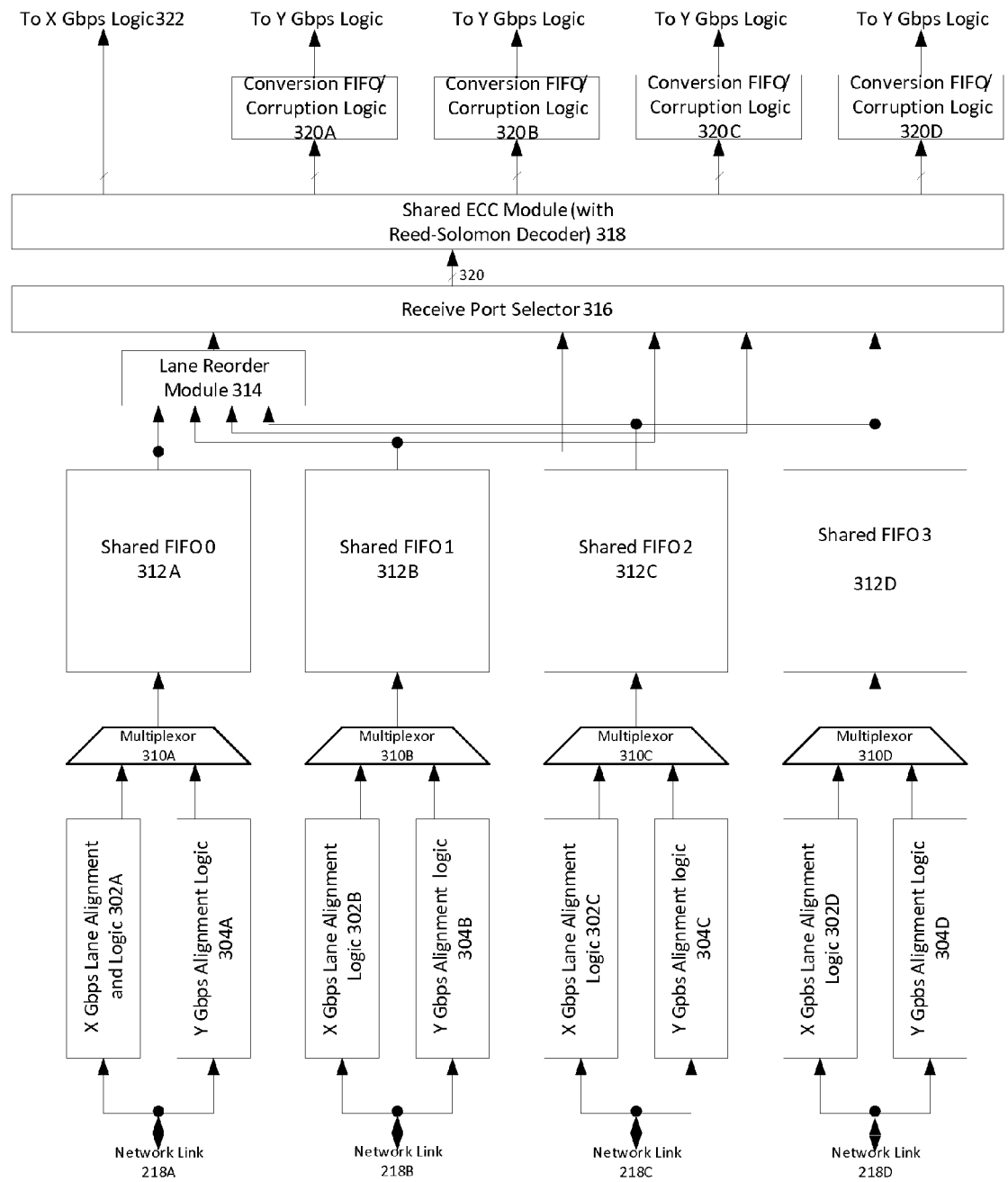
FIG. 3A shows a system with shared logic for the adapter of FIG. 2, according to the various aspects of the present disclosure.

FIG. 3A shows a system 300 for adapter 118 that uses shared logic for processing frames in the first and second operating modes, according to one aspect of the present disclosure. Portions of system 300 may be implemented at ports 216A-216D and the receive module 210. As mentioned above, the ports 216A-216D may be configured to operate jointly as a single port or each port may operate as an independent port. Each port is coupled to a network link 218A-218D that is used to send and receive information (may be referred to as frames or packets).

Each port includes lane alignment logic 302 (shown as 302A-302D) and 304 (shown as 304A-304D for each port). Logic 302 is used when the four ports are configured to operate as in the first mode as a single port operating at X Gbps (for example, 128 Gbps). Logic 304 is used when each port is operating as an independent port in the second mode at Y Gbps (for example, 32 Gbps). It is noteworthy that the adapter 118 may have enough ports such that some ports operate in the first mode and other ports operate in the second mode. Network links 218A-218D may each operate at Y Gbps or at a combined rate of X Gbps.

In one aspect, logic 302 includes a state machine that pre-processes a portion of a received frame in the first mode and tags the frame with a lane number (i.e. 218A-218D) on which it is received. This allows out of order packets to be re-ordered. Logic 304 may also include a state machine for pre-processing frames that are received by links 218A-218D when the ports operate in the second mode. System 300 also includes a multiplexor 310 (shown as 310A-310D) to select frames from either logic 302 or 304. The selected frames or portions of the frames are placed at shared FIFO 312 (shown as 312A-312D).

In one aspect, the shared FIFOs 312A-312D are shared for both port configurations (i.e. first at X or second at Y Gbps). The shared FIFOs may be written using two bus formats for each operating mode. For example, a 66-bit bus may be used for writing data for the first operating mode, while an 80-bit bus may be used for the second operating mode.

When the ports are in the first operating mode, then in addition to holding data, the shared FIFO also operates as an alignment marker/de-skew device to absorb lane skew across the four lanes. When operating in the first mode, frames may be received across four lanes (for example, 218A-218D) and lane skew refers to data arriving at different times. Lane de-skewing is used to remove lane skew across the four lanes. In one aspect, frames from shared FIFO 312A-312D are reordered by the lane reorder module 314 and then provided to a shared error correction code (ECC) module 318 that includes a decoder (may also be referred to as decoder 318) that is described below in detail. The tag inserted by logic 302 is used to reorder lanes.

When the ports are in the second operating mode, then the shared FIFOs 312A-312D hold frames until the frames are ready to be forwarded to the decoder of ECC module 318 that is described below in detail. In one aspect, frames from the shared FIFOs 312A-312D are moved to the decoder of the ECC module 318 based on a signal from the receive port selector 316. The receive port selector 316 manages access to the decoder of the ECC module 318. In one aspect, the decoder is time shared among the different ports that operate in the second mode. The receive port selector 316 rotates in selecting frames from the shared FIFOs 312A-312D so that no one receive port monopolizes access to the decoder of the ECC module 318.

Figure 3B:
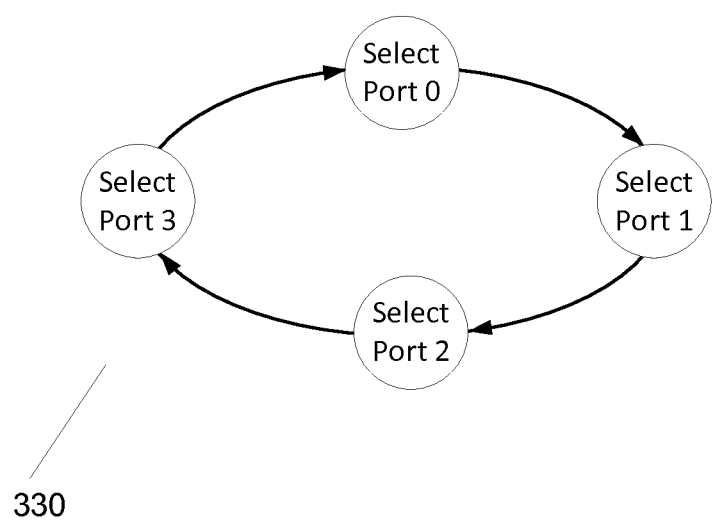
FIG. 3B shows a state machine diagram, used by the system of FIG. 3A, according to one aspect of the present disclosure.

In one aspect, the receive port selector 316 includes a state machine that moves through a plurality of states to select between ports 216A-216D (i.e. Port 0-Port 3). FIG. 3B shows a state machine diagram 330 used by the receive port selector 316 for providing access to decoder 316. When the state machine is in the Select Port 0 state, it will move a block of data from Shared FIFO 0 312A if a block is available. The state machine will take certain duration, for example, 17 425 MHz clocks to move a block before it transitions to Select Port 1. If there isn't enough data in Shared FIFO 0 to move, the state machine will still wait for certain duration before transitioning to the Select Port 1 state. Then, from the Select Port 1, the state machine either moves data when there is data available in Shared FIFO 1 312B or waits if there no data is available. Whether there is data or not, the state machine waits for certain duration before transitioning to the Select Port 2 state and then to the Select Port 3 state.

In one aspect, the decoder of the ECC module 318 may be a Reed-Solomon decoder that enables decoding of codewords. The decoder of the ECC module 318 includes hardware for decoding codewords and performing error correction when needed. The decoder of the ECC module 318 is shared between the ports regardless of the operating mode of the ports. In one aspect, the decoder of the ECC module 318 operates using at least two different clock sources. When the ports are configured for a combined rate of X Gbps, then the clock is received from the incoming data. For Y Gbps (i.e. in the second operating mode), the decoder of the ECC module 318 may use a default system clock, for example, 425 MHz. The adaptive aspects described herein are not limited to any specific clock.

After data is decoded, the data is staged at conversion FIFO/corruption logic 320A-320D, when the ports are operating in the second mode. When the ports are configured to operate in a first mode, then the data is sent to the X Gbps logic (not shown) via connection 322. Logic 320A-320D receives the output from the decoder of the ECC module 318 and temporarily stores the data. As temporary storage, the logic operates as a FIFO. The output is also converted by logic 320A-320D to a different bit width, for example, from 320 bit to 257 bits. If the data received at logic 320A-320D is uncorrectable, then corruption logic at logic 320A-320D processes the corrupt data.

Figure 4:
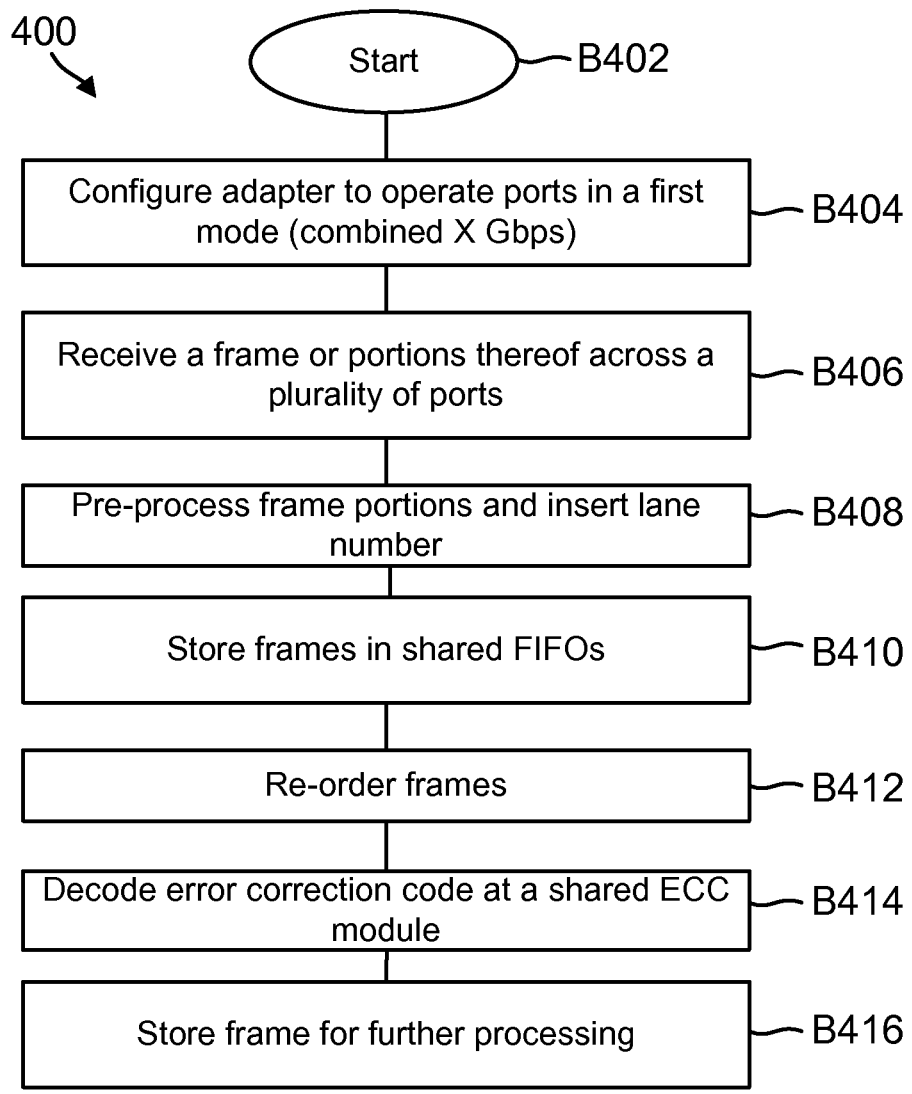
FIG. 4 shows a process flow for processing frames received by the adapter in a first configuration, according to one aspect of the present disclosure.

Process Flow:

FIG. 4 shows a process 400 for using the system of FIG. 3 in the first operating mode, according to one aspect of the present disclosure. The process begins in block B402, when the host system and adapter 118 are initialized. In one aspect, in block B404, a plurality of adapter ports 216A-216D are configured to operate at a combined operating speed of X Gbps (for example, 128 Gbps) i.e. in the first operating mode. The adapter ports may be configured by using a management application executed by a processor. The configuration process enables a user to store port configuration information at a memory location of the adapter 118. In block B406, a portion or the complete frame may be received across any of the plurality of ports.

In block B408, the frame portions are pre-processed and a lane number is tagged by alignment logic 302A-302D. In block B410, the frame portions are then stored at the shared FIFIO 312A-312D, depending on which port received the frame portion. In block B412, the frame portions are re-ordered using the lane numbers inserted in block B408. The re-ordered frame is then sent to the shared decoder of the ECC module 318 for decoding in block B414. Thereafter, the decoded frame is provided to logic 322, in block B416, for further processing.

Figure 5:
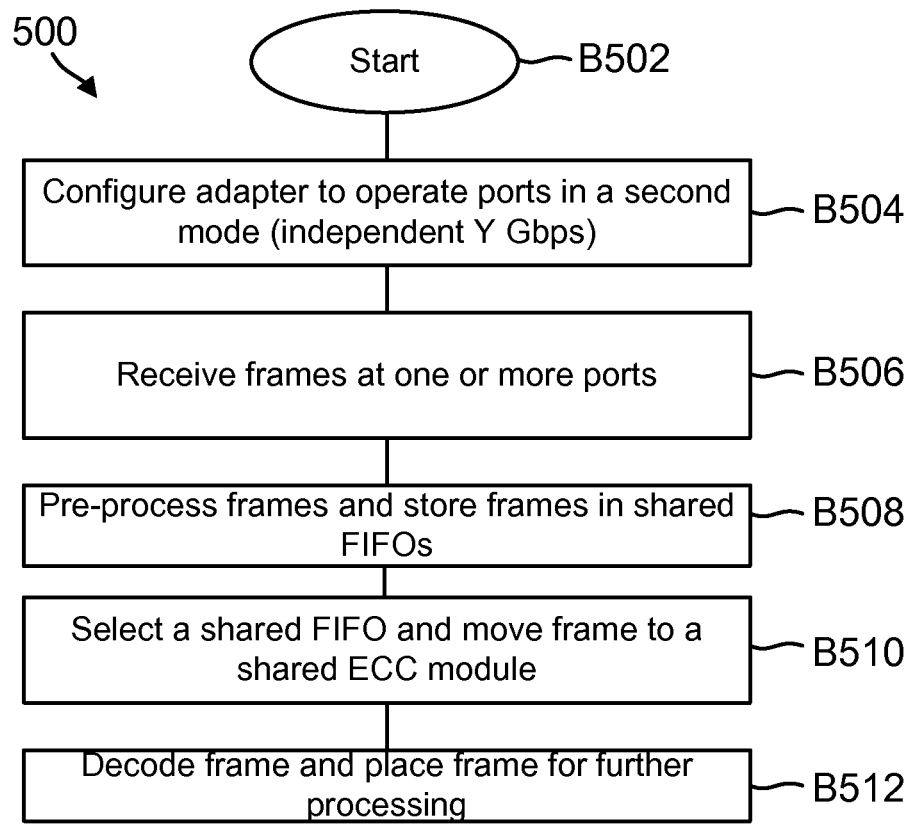
FIG. 5 shows a process flow for processing frames received by the adapter in a second configuration, according to one aspect of the present configuration.

FIG. 5 shows a process 500 for using the system of FIG. 3 when each port is configured to operate as an independent port for sending and receiving data in the second operating mode, i.e. Y Gbps (for example, 32 Gbps), according to one aspect of the present disclosure. The process begins in block B502. In block B504, ports 216A-216D are configured to operate as independent ports in the second operating mode. In this configuration, links 218A-218D operate independently for sending and receiving data. The adapter ports may be configured by using a management application executed by a processor. The configuration process enables a user to store port configuration information at a memory location of the adapter 118.

In block B506, one or more of the ports receive frames from other devices. The frames are stored at logic 304A-304D depending on which port has received the frames. After the frames are pre-processed, the frames are stored at the shared FIFOs 312A-312D, in block B508. For example, a frame received at port 216A via link 218A is stored at shared FIFO 312A, while a frame received via link 218D is stored at shared FIFO 312D.

In block B510, the receive port selector 316 selects one or more frames from the shared FIFO. As described above with respect to FIG. 3B, the receive port selector 316 selects different shared FIFOs so that frames received at different ports can be processed efficiently. Thereafter, in block B512, the frames are decoded by the decoder of the ECC module 318 and then placed at FIFO 320A-320D for further processing.

In one aspect, an adapter having a plurality of ports that can be configured to operate as independent ports or a single port, share the same decoder and shared FIFOs. This reduces gate count and complexity.

The above description presents the best mode contemplated for carrying out the various aspects of the present disclosure, and of the manner and process of making and using it, in such full, clear, concise, and exact terms as to enable any person skilled in the art to which it pertains to make and use this disclosure. The various aspects of the present disclosure are, however, susceptible to modifications and alternate constructions from that discussed above that are fully equivalent. Consequently, this disclosure is not limited to the particular aspects disclosed. On the contrary, this disclosure covers all modifications and alternate constructions coming within the spirit and scope of the disclosure as generally expressed by the following claims, which particularly point out and distinctly claim the subject matter of the disclosure.

What is claimed is:

1. A network device, comprising:
a plurality of ports for connecting the network device to a network via a plurality of links, where the plurality of ports are configured to operate in a first operating mode as a single port operating at a first operating speed and in a second operating mode where each of the plurality of ports operate as an independent port connected to the network via one of the plurality of links at a second operating speed;
a shared memory device for staging information received from the network for the plurality of ports operating in the first operating mode and the second operating mode;
a receive port selector that selects information from the shared memory device when the plurality of ports are operating in the second operating mode; and
a shared error correction code module for decoding and performing error correction on information received via the network for the first operating mode and the second operating mode;
wherein the shared error correction module includes a shared decoder that operates using at least two different clocks, where for the first operating mode, a clock is obtained from information received from the network and for the second operating mode, a default system clock is used to decode received information.

2. The network device of claim 1, wherein the error correction module includes a shared Reed-Solomon decoder.

3. The network device of claim 1, wherein in the first operating mode, the plurality of ports operate at a combined rate of 128 gigabits per second.

4. The network device of claim 1, wherein in the second operating mode, each of the plurality of ports operate at a rate of 32 gigabits per second.

5. The network device of claim 1, wherein the plurality ports are configured to operate as Fibre Channel ports.

6. The network device of claim 1, wherein the plurality of ports are configured to operate as Fibre Channel over Ethernet ports.

7. The network device of claim 1, further comprising: a lane reordering module that reorders information when the plurality of ports are operating in the first operating mode and information is received at different ports.

8. A machine implemented method, comprising:
configuring a plurality of ports of a network device to operate in a first operating mode or a second operating mode for connecting the network device to a network via a plurality of links, where in the first operating mode the plurality of ports are configured as a single port operating at a first operating speed and in the second operating mode, each of the plurality of ports operate as an independent port at a second operating speed;
staging information received from the network for the plurality of ports operating in the first operating mode and the second operating mode at a shared memory device;
selecting by a receive port selector information from the shared memory device when the plurality of ports are operating in the second operating mode; and
decoding by a shared error correction code module and performing error correction on information received via the network for the first operating mode and the second operating mode;
wherein the shared error correction module includes operates using at least two different clocks, where for the first operating mode, a clock is obtained from information received from the network and for the second operating mode, a default system clock is used for decoding.

9. The method of claim 8, wherein the shared error correction module includes a shared Reed-Solomon decoder.

10. The method of claim 8, wherein in the first mode, the plurality of ports operate at a combined rate of 128 gigabits per second.

11. The method of claim 8, wherein in the second mode, each of the plurality of ports operate at a rate of 32 gigabits per second.

12. The method of claim 8, wherein the plurality ports are configured to operate as Fibre Channel ports.

13. The method of claim 8, wherein the plurality of ports are configured to operate as Fibre Channel over Ethernet ports.

14. The method of claim 8, wherein a lane reordering module reorders information when the plurality of ports are operating in the first operating mode and information is received at different ports.

15. A non-transitory, machine readable storage medium having stored thereon instructions for performing a method, comprising machine executable code which when executed by at least one machine, causes the machine to:
configure a plurality of ports of a network device to operate in a first operating mode or a second operating mode for connecting the network device to a network via a plurality of links, where in the first operating mode the plurality of ports are configured as a single port operating at a first operating speed and in the second operating mode, each of the plurality of ports operate as an independent port at a second operating speed;
stage information received from the network for the plurality of ports operating in the first operating mode and the second operating mode at a shared memory device;
select by a receive port selector information from the shared memory device when the plurality of ports are operating in the second operating mode; and
decode by a shared error correction code module and performing error correction on information received via the network for the first operating mode and the second operating mode;
wherein the shared error correction module uses at least two different clocks, where for the first operating mode, a clock is obtained from information received from the network and for the second operating mode, a default system clock is used to decode.

16. The storage medium of claim 15, wherein the shared error correction module includes a shared Reed-Solomon decoder.

17. The storage of claim 15, wherein in the first mode, the plurality of ports operate at a combined rate of 128 gigabits per second.

18. The storage medium of claim 15, wherein in the second mode, each of the plurality of ports operate at a rate of 32 gigabits per second.

19. The storage medium of claim 15, wherein the plurality of ports are configured to operate as Fibre Channel ports or as Fibre Channel over Ethernet ports.

20. The storage medium of claim 15, wherein a lane reordering module reorders information when the plurality of ports are operating in the first operating mode and information is received at different ports.

* * * * *